*NO PRINTED SPECIFICATION AVAILABLE*
9436X
A. MUDGE.
SMUT MACHINE.
Patented Feb. 25, 1836
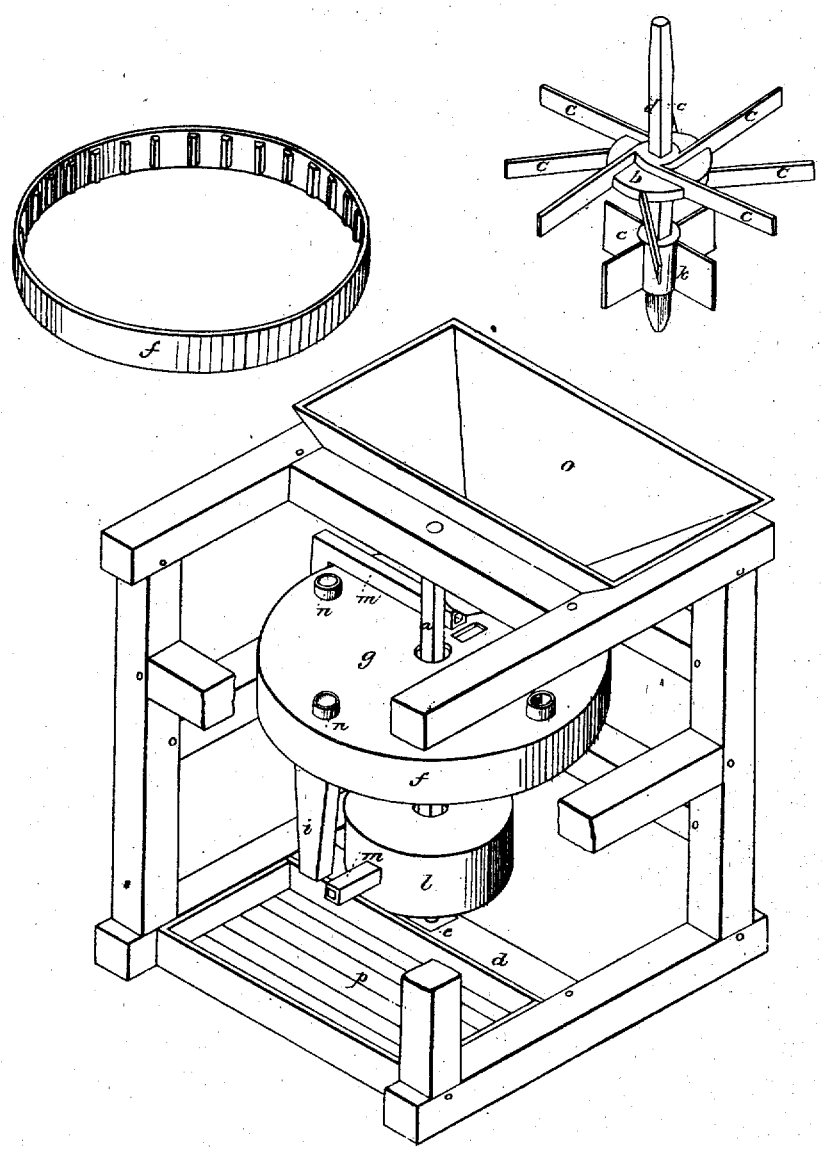

Abraham Mudge. Canajoharie . New York

Letters Patent

The Schedule referred to in these Letters Patent and making part
of the same containing a description in the words of the said Abraham
Mudge himself of his improvement in the machine for separating
smut and other impurities from grain.

To all to whom these Presents shall come. Be it known that
I Abraham Mudge of Canajoharie in the County of Montgomery
and State of New York have invented a new and useful machine for
the purpose [illegible] and other impure substances from wheat and other kinds
of grain and that the following is a full and exact description of the con
struction & operation of the said machine as invented by me.
Near the centre of an iron shaft (of about three feet in length & one &
a half inches in diameter turned and fitted for running in an
upright position) place a circular plate of cast iron ten inches in diam
ter and of sufficient thickness to fasten firmly on the shaft. This
plate is provided with eight or more wings or flanges projecting one inch
more or less above and below the plate and extending two inches beyond
the verge of the plate. the wings or flanges on the under side occupying
the spaces between the wings or flanges on the upper side or the wings
or flanges may be connected after they project beyond the plate & form
but half the number of wings described above but double the width.
The shaft with the circular plates and wings or flanges secured thereon
and well balanced is then placed in a convenient frame fitted to receive
it with a step Boxes &c &c. — The plate and wings are then
surrounded by a curb of cast iron or some other metal of such diame
ter that the space between the wings and the inner surface of the
curb will be about one inch. the curb of cast iron is furnished
with teeth projecting from the inner surface about one third of an inch
and terminating half an inch from the lower edge or bottom of the curb and about two inches apart. or if the curb is made of sheet
Iron it may be perforated with small holes or the curb may be made of
Stone. — The depth or height of the curb is such that the wings will
be about one third of an inch from the floor on which the curb rests.
and the same distance from the cover. of the curb rests on a floor of
cast or sheet iron and is covered at top also with cast or sheet iron.
Near the centre of the cover is an opening to admit the grain into the
machine. And through the floor on which the curb rests and
near the outer side is also an opening of about three inches long and
one and one half inches wide for the purpose of allowing the grain to
escape. On the same shaft and at a convenient distance below
the bottom of the curb is a wind wheel of about fourteen inches di
ameter and about five inches in depth enclosed in a case of tin
or sheet iron having two places of discharge. one of the spouts or
places of discharge directs to the grain as it escapes from the
machine above. The grain as it escapes from the curb is conduc
ted by a short spout into the current of air set in motion by
wheel which current of air is confined and forced
the wind passes through the stream of grain as it falls from
the short spout into a narrow spout placed to receive it
standing on an inclination of about fifty degrees elevation
through which the wind drives the dust &c and the grain de
scends into a reservoir below. The other wind spout or place of dis
charge for wind is on the opposite side of the machine and
the wind is conducted upwards to the upper side of the curb
by means of a spout or conduit and then directed across the
cover of the curb and made to pass through the grain before
it enters the machine for the purpose of separating smut balls
&c from the grain. There is also one or more openings through
the covering of the curb near the outer edge and spouts attach
ed thereto for the purpose of allowing smut & dust to escape
from the machine. The machine is set in motion by mean
of a pulley and strap at the rate of about [illegible] hundred
revolutions per minute. The grain being introduced through 9436x Feb 25, 1836

[illegible] of the curb near the centre is thrown by the wings or flanges attached
to the circular plates against the curb and ribs or projections attached thereto
with sufficient force to break the smut balls and disengage smut and other
impure substances which adhere to grain and is kept passing swiftly around
the curb until it escapes thro the opening in the floor on which the curb rests
and is conducted by the short spout into the current of air set in motion
by the wind wheel before described. A machine of the above described di-
mensions will clean from eight to ten bushels of grain an hour. When a
machine is required to perform more business, the dimensions are to be enlarged
in proportion to the amount of business required to be performed, and two
or more of the circular plates with wings or flanges (proportioned to the dimen
sions of the curb to be used) are to be placed on the shaft. The wings on the up
permost plate alternating or occupying the spaces between wings on the plates
beneath them. The principles which I claim to have applied to the pur-
pose of cleaning grain from smut and other impure substances by means of the
machine above described, and which application I claim to have invented
and which I believe to be new and useful is that of throwing the grain by
means of wings or flanges attached to a circular plate as above described
against some hard substance with sufficient force to break smut balls &c &c
And whether the plate be circular or of any other form or whether the wings
or flanges be of any other form or dimensions than I have described, the inventing
attaching wings or flanges to a plate of cast iron or of any other substance
for the purpose of cleaning grain I claim as my invention. The form of the
curb with ribs projecting inward from the inner surface whether made of
cast iron or any other material I also claim as my invention. The
[illegible] curb either with ribs or furrows or without either I also claim
as part of my invention and the wind wheel with two places of discharge
through the covering I also claim as part of my invention Witnesses
Obr A Terry
Henry S. [illegible]

Abraham Mudge

Exd [illegible]

(1170 Words) (February 25. 1836)

[illegible]